(12) United States Patent
Hauer et al.

(10) Patent No.: US 6,871,720 B2
(45) Date of Patent: Mar. 29, 2005

(54) STEERING DEVICE FOR A MOTOR VEHICLE

(75) Inventors: Constantin Hauer, Schöllkrippen (DE); Axel Wulf, Aschaffenburg (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 0 days.

(21) Appl. No.: 10/323,316

(22) Filed: Dec. 18, 2002

(65) Prior Publication Data

US 2003/0111278 A1 Jun. 19, 2003

(30) Foreign Application Priority Data

Dec. 19, 2001 (DE) ..................................... 201 20 542 U

(51) Int. Cl.⁷ .................................................. B62D 1/04
(52) U.S. Cl. ..................... 180/315; 180/333; 74/484 R; 74/485; 74/552
(58) Field of Search ............................... 74/552, 501.6, 74/502, 484 R, 485, 500.5; 180/315, 332, 333, 402, 444; 318/488–490; 280/731

(56) References Cited

U.S. PATENT DOCUMENTS

| | | | | |
|---|---|---|---|---|
| 5,560,648 A | * | 10/1996 | Rhule et al. | ................. 280/731 |
| 6,153,996 A | | 11/2000 | Nigrin et al. | |
| 6,227,327 B1 | * | 5/2001 | Nigrin et al. | ................ 180/402 |
| 6,491,128 B1 | | 12/2002 | Lehmann et al. | |

FOREIGN PATENT DOCUMENTS

| | | | | |
|---|---|---|---|---|
| DE | 3443644 A1 | * | 6/1985 | ........... B60K/28/00 |
| DE | 199 27 464 A1 | | 12/2000 | |
| EP | 1046572 | | 10/2000 | |
| JP | 04183439 A | * | 6/1992 | ............ A61B/5/18 |
| JP | 05310130 A | | 11/1993 | |
| JP | 05345569 A | * | 12/1993 | ............ B62D/1/06 |
| WO | 99/12791 | | 3/1999 | |
| WO | 01/94188 | | 12/2001 | |

\* cited by examiner

*Primary Examiner*—Lesley D. Morris
*Assistant Examiner*—L. Lum
(74) *Attorney, Agent, or Firm*—Tarolli, Sundheim, Covell & Tummino L.L.P.

(57) ABSTRACT

A steering device for a motor vehicle has a stationary steering wheel rim, a measurement transducer integrated into the steering wheel rim and provided for generating an electric or electronic signal, and an actuator that can be actuated as a function of the electronic signal in order to adjust steerable wheels. The measurement transducer comprises touch-sensitive sensors on the circumference of the steering wheel rim which detect a position and movement of the hands of a driver touching the steering wheel rim and generate the electric or electronic signal that corresponds to the position and the movement of the hands. An electronic unit for detecting the signal and converting it into a steering signal for controlling the actuator is associated with the measurement transducer.

7 Claims, 1 Drawing Sheet

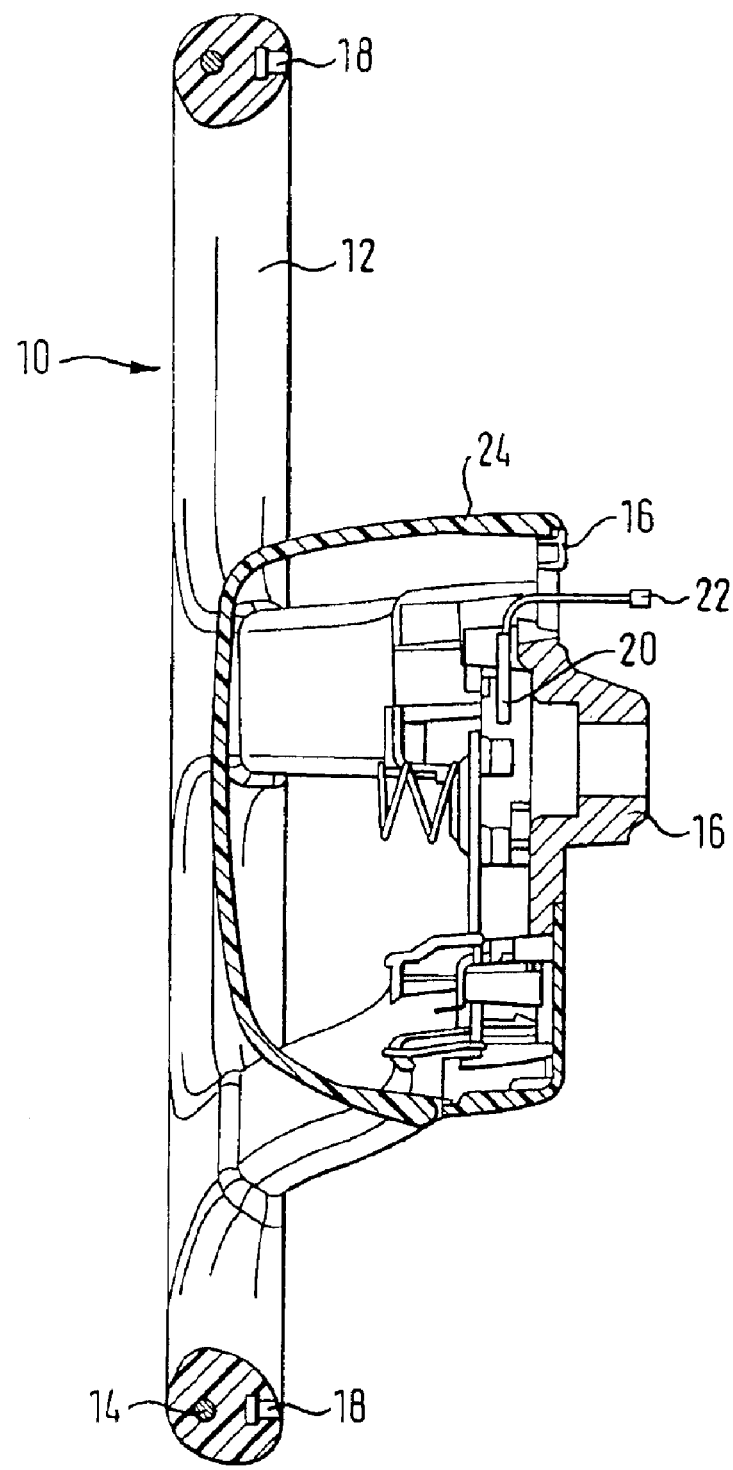

STEERING DEVICE FOR A MOTOR VEHICLE

TECHNICAL FIELD

The present invention relates to a steering device for a motor vehicle.

BACKGROUND OF THE INVENTION

Known steering devices comprise a stationary steering wheel rim, a measurement transducer integrated into the steering wheel rim and provided for generating an electronic signal, and an actuator that can be actuated as a function of the electronic signal in order to adjust steerable wheels.

For some time now, due to reasons of both safety and convenience, more and more devices for actuating various vehicle functions are being arranged directly on the steering wheel so that the driver is no longer forced to take his/her hand off the steering wheel to operate such functions. The transmission of electric signals generated on a rotatable steering wheel to the actuating elements that are arranged in a stationary position on the car body, however, is not unproblematic, especially in case a large number of signals has to be transmitted. Therefore, stationary or virtually stationary steering devices have been proposed with which the mechanical coupling between the steering device and the steering linkage has been replaced by a measurement transducer on the steering device and by an actuator on the steering linkage. Such steering devices can dispense with the usual maximum of two-and-a-half to four revolutions of the steering wheel to reach the maximum wheel angle position, and the actual travel distance for the actuation of the steerable wheels can be limited to an angle of rotation of 30° or less. As a result, the transmission of a large number of signals no longer poses a problem since the actuation devices can be arranged on parts of the steering device that are configured so as to be stationary relative to the car body. This greatly simplifies the wiring layout needed to make an electrical connection between the actuation devices and the stationary parts.

A mechanical uncoupling and electric transmission of the steering command to the steerable wheels is also necessary if modern safety systems are to effectuate driver-independent vehicle stabilization and if an influence is to be exerted on the adjustment angle of the steerable wheels.

EP-A-1 046 572 describes a steering device with a non-rotatable frame that has an axis of symmetry and arc-shaped guide sections, a pair of handles that are coupled to each other and mounted on the guide sections so as to move in the same direction and that can be moved to a limited extent relative to the axis of symmetry, and it also describes a measurement transducer for generating an electric or electronic signal that serves to determine the position of the two handles relative to the frame.

WO-A 99/12791 relates to a steering device for a motor vehicle with an actuation member for initiating a steering movement and a steering linkage for transmitting the steering movement to the wheels, the actuation member consisting of a non-rotatable steering wheel the rim of which contains a band-shaped or chain-like actuation ring that is movable relative to the rim, and a measurement transducer for generating an electric or electronic position signal for the actuation ring. The steering linkage is actuated by an actuator that can be controlled by an electric or electronic regulating device as a function of the position signal.

DE 199 27 467 A1 describes a rotating steering wheel with touch elements for actuating electrically controllable devices in a motor vehicle, the touch elements being piezo-electric pressure sensors. Some of the pressure sensors are arranged in an activation area, whereas the other pressure sensors form a control area that is distinguished from the activation area. Through the actuation of the pressure sensors located in the activation area, it is intended to associate various control functions with the pressure sensors located in the control area.

JP-A 05-310130 discloses a steering wheel with pressure sensors detecting the pressure of the palms gripping the steering wheel. Through the level of the pressure exerted, it is intended to identify an imminent steering motion and to predict the direction of the steering motion.

The present invention provides a steering device that is less complex in design and that can consequently be manufactured more cost-effectively.

BRIEF SUMMARY OF THE INVENTION

According to the invention, a steering device for a motor vehicle comprises a stationary steering wheel rim, a measurement transducer integrated into the steering wheel rim and provided for generating an electric or electronic signal, and an actuator that can be actuated as a function of the electronic signal in order to adjust steerable wheels. The measurement transducer comprises touch-sensitive sensors on the circumference of the steering wheel rim which detect a position and movement of the hands of a driver touching the steering wheel rim and generate the electric or electronic signal that corresponds to the position and the movement of the hands. An electronic unit for detecting the signal and converting it into a steering signal for controlling the actuator is associated with the measurement transducer.

The position and the motions, detected by the sensors, of the hands touching the steering wheel are thus converted into electronic signals in a simple manner. These signals are representative for the sense of rotation, the angle of rotation and the speed of rotation of the steering wheel. With this, the acceptance of the "steering-by-wire" system can be improved on the side of the customer.

In an advantageous manner, the touch-sensitive sensors are configured as pressure-sensitive sensors. In particular, they can function in the same way as the sensors known from a "touchscreen" or "touchpad". Preferably, the touch-sensitive sensors are located on the underside of the steering wheel rim, e.g. on the side of the non-rotating steering wheel facing away from the driver. This protects the sensors from being touched inadvertently and thus prevents unwanted steering motions.

The touch-sensitive sensors are preferably distributed across the entire circumference of the steering wheel rim. Thus, the driver has optimal access to the sensors. Of course, it is also possible for the touch-sensitive sensors to be arranged only in a partial area of the steering wheel circumference, which can then be differentiated—by color or in another manner that is clear to the driver—from the other parts of the steering wheel rim and from any actuation device that might be arranged in said area.

Preferably, the steering signal is calculated from the electric or electronic signals generated by the touch-sensitive sensors by means of software that is integrated into the electronic unit. The position and movement of the hands on the touch-sensitive sensors are converted into a steering signal for actuating the actuator of the vehicle wheels in a manner similar to the sense of rotation, angle of rotation and speed of rotation of a conventional steering wheel. It is especially advantageous that the steering signal can be calculated according to the speed of the vehicle. In this manner, different driving situations can be taken into account. For example, when the car is riding straight ahead on a highway, the movement of the hands on the touch-sensitive sensors should generate less pronounced steering movements of the wheels than when the car is being parked at low speed.

In cases of restraint following a car accident, the stationary construction of the steering wheel has proven to be especially advantageous since the steering wheel can be equipped with a stationary airbag module having an asymmetrical airbag, so that a better restraint effect can be achieved that is adapted to the particular accident situation.

In comparison to the known steering devices, which allow electronically assisted steering (steering by wire), the steering device according to the invention has a much simpler construction with fewer moving parts and consequently, it is easier to maintain and can also be manufactured more cost-effectively.

Additional features and advantages of the invention will be apparent from the from the description below.

BRIEF DESCRIPTION OF THE DRAWING

The single drawing FIGURE is a schematic representation of a cross section of a steering wheel according to the invention.

DETAILED DESCRIPTION OF THE PREFERRED EMBODIMENT

The steering wheel 10 shown in the drawing FIGURE has a steering wheel rim 12 and a skeleton 14 that stabilizes the steering wheel rim. The steering wheel is stationarily, i.e. not rotatably, connected via an attachment device 16 to a support on the car body.

In the embodiment shown, the touch-sensitive sensors 18 are arranged on the bottom of the steering wheel rim 12. These touch-sensitive sensors can be configured as pressure-sensitive sensors of the type known from "touchscreens" or "touchpads", for instance in the form of a pressure-sensitive film; these sensors are distributed here continuously across the entire circumference of the steering wheel rim. As an alternative, it is also possible for the touch-sensitive sensors 18 to be arranged only in partial areas of the steering wheel rim 12. These partial areas are then preferably distinguished from the other parts of the steering wheel rim by color.

The touch-sensitive sensors 18 are linked to an electronic unit 20 which detects the electric or electronic signals generated by the touch-sensitive sensors and converts them into a steering signal for addressing the actuator of the vehicle wheels (not shown here). In this context, the electronic unit 20 is also equipped with an interface 22 to the rest of the vehicle electronics. This is where the steering signals can also be used to calculate data for other vehicle functions such as, for example, an electronic stabilization system.

The steering wheel 10 according to the invention can also be equipped with an airbag module of which only the cover 24 is shown schematically in the figure. Preferably, this airbag module has an asymmetrical airbag (not shown here).

When the touch-sensitive or pressure-sensitive sensors 18 are touched with the hands, the driver generates an electric or electronic signal that simulates the familiar steering movements of a conventional steering wheel in terms of the sense of rotation, angle of rotation and speed of rotation. This electronic signal is transmitted to an electronic unit 20 where it is converted into a steering signal, preferably by means of software, as a function of the vehicle speed detected by other sensors. This steering signal then serves to actuate the actuator for the steerable vehicle wheels.

Therefore, with the present invention, electronically assisted steering (steering by wire) is made possible, whilst the effort needed to manufacture the steering wheel can be kept to a minimum due to the fact that there are no moving parts. Since the steering wheel according to the invention does not rotate, all of the feed lines for the other actuation devices arranged in the steering wheel can be connected to the vehicle electronic system without any problems. The steering wheel according to the invention is also suitable for use in different types of vehicles since an adaptation to all kinds of different driving situations can be made by means of software. Thanks to the absence of moving parts, the steering wheel according to the invention is virtually free of wear-and-tear and it is low-maintenance.

What is claimed is:

1. A steering device for a motor vehicle, said steering device comprising a stationary steering wheel rim, a measurement transducer integrated into said steering wheel rim and provided for generating an electric or electronic signal, and an actuator that can be actuated as a function of said signal in order to adjust steerable wheels, the improvement consisting in that said measurement transducer comprises stationary touch-sensitive sensors disposed on a circumference of said steering wheel rim which detect a position and movement of a driver's hands touching said steering wheel rim and generate said signal that corresponds to said position and said movement of said hands, and in that an electronic unit for detecting said signal and converting said signal into a steering signal for controlling said actuator is associated with said measurement transducer.

2. The steering device according to claim 1, wherein said touch-sensitive sensors are configured as pressure-sensitive sensors.

3. The steering device according to claim 1, wherein said touch-sensitive sensors are arranged on an underside of said steering wheel rim.

4. A steering device for a motor vehicle, said steering device comprising a stationary steering wheel rim, a measurement transducer integrated into said steering wheel rim and provided for generating an electric or electronic signal, and an actuator that can be actuated as a function of said signal in order to adjust steerable wheels, the improvement consisting in that said measurement transducer comprises stationary touch-sensitive sensors disposed on a circumference of said steering wheel rim which detect a position and movement of a driver's hands touching said steering wheel rim and generate said signal that corresponds to said position and said movement of said hands, and in that an electronic unit for detecting said signal and converting said signal into a steering signal for controlling said actuator is associated with said measurement transducer, said touch-sensitive sensors being distributed continuously across the entire circumference of said steering wheel rim.

5. The steering device according to claim 1, wherein said touch-sensitive sensors are arranged in a partial area of said steering wheel circumference.

6. The steering device according to claim 1, wherein said electronic unit includes software to calculate said steering signal.

7. A steering device for a motor vehicle driving at a speed, said steering device comprising a stationary steering wheel rim, a measurement transducer integrated into said steering wheel rim and provided for generating an electric or electronic signal, and an actuator that can be actuated as a function of said signal in order to adjust steerable wheels, the improvement consisting in that said measurement transducer comprises stationary touch-sensitive sensors disposed on a circumference or said steering wheel rim which detect a position and movement of a driver's hands touching said steering wheel rim and generate said signal that corresponds to said position and said movement of said hands, and in that an electronic unit for detecting said signal and converting said signal into a steering signal for controlling said actuator is associated with said measurement transducer, said calculation being made as a function of the speed of said vehicle.

* * * * *